(12) United States Patent  
Sakamaki et al.

(10) Patent No.: US 10,809,369 B2  
(45) Date of Patent: Oct. 20, 2020

(54) RADAR SIGNAL PROCESSING APPARATUS AND RADAR SIGNAL PROCESSING METHOD

(71) Applicant: Mitsubishi Electric Corporation, Tokyo (JP)

(72) Inventors: Hiroshi Sakamaki, Tokyo (JP); Teruyuki Hara, Tokyo (JP); Toshihiko Arioka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 198 days.

(21) Appl. No.: 16/088,195

(22) PCT Filed: Apr. 22, 2016

(86) PCT No.: PCT/JP2016/062783  
§ 371 (c)(1),  
(2) Date: Sep. 25, 2018

(87) PCT Pub. No.: WO2017/183186  
PCT Pub. Date: Oct. 26, 2017

(65) Prior Publication Data  
US 2020/0233075 A1     Jul. 23, 2020

(51) Int. Cl.  
*G01S 13/58* (2006.01)  
*G01S 13/88* (2006.01)

(52) U.S. Cl.  
CPC .............. *G01S 13/58* (2013.01); *G01S 13/88* (2013.01)

(58) Field of Classification Search  
CPC ................................. G01S 13/58; G01S 13/88  
See application file for complete search history.

(56) References Cited

U.S. PATENT DOCUMENTS

2016/0157073 A1*   6/2016   Ishikawa ................ G08B 21/10  
                                                               455/404.1

FOREIGN PATENT DOCUMENTS

JP      2002-323558 A     11/2002  
JP      2015-180858 A     10/2015

OTHER PUBLICATIONS

"Coastal Marine Observation by Land-Based Radar", Japan Society of Civil Engineers, Mar. 10, 2001.  
Belinda J. Lipa, et al. "HF Radar Detection of Tsunamis", Journal of Oceanography, vol. 62, pp. 705-716, 2006.  
(Continued)

*Primary Examiner* — Timothy A Brainard  
(74) *Attorney, Agent, or Firm* — Birch, Stewart, Kolasch & Birch, LLP

(57) ABSTRACT

An observation area is divided into coarse resolution areas each being an area larger than a range cell, a coarse-resolution-area creating unit (12) is provided to calculate a Doppler velocity for each coarse resolution area on the basis of Doppler velocities in a plurality of range cells included in each coarse resolution area among Doppler velocities in range cells calculated by a Doppler velocity calculating unit (11), and a range cell detecting unit (13) detects a range cell in which an observation target is present from the Doppler velocity for each coarse resolution area calculated by the coarse-resolution-area creating unit (12) and the Doppler velocities for the range cells calculated by the Doppler velocity calculating unit (11).

6 Claims, 6 Drawing Sheets

(56) References Cited

OTHER PUBLICATIONS

Belinda Lipa, et al. "High-frequency radar observations of the Jun. 2013 US East Coast meteotsunami", Nat Hazards (2014) 74:109-122.
Belinda Lipa, et al. "Japan Tsunami Current Flows Observed by HF Radars on Two Continents", Remote Sens. 2011, 3, pp. 1663-1679.
Belinda Lipa, et al. "Tsunami Arrival Detection with High Frequency (HF) Radar", Remote Sens. 2012, 4, pp. 1448-1461.
International Search Report, issued in PCT/JP2016/062783, PCT/ISA/210, dated Jun. 7, 2016.

\* cited by examiner

RADAR SIGNAL PROCESSING APPARATUS AND RADAR SIGNAL PROCESSING METHOD

TECHNICAL FIELD

The present disclosure relates to radar signal processing apparatuses and radar signal processing methods for receiving radio waves reflected from an observation area and detecting an observation target from the radio waves.

BACKGROUND ART

Tsunamis are triggered by displacements in topographic features on the sea floor and occur when the sea floor rises or falls over a wide range.

A tsunami is an oceanographic phenomenon appearing as propagation of displacement of the sea surface caused by the vertical movements of the sea floor. Such a tsunami causes serious damage to social life and is thus desired to be detected early.

Tsunamis are typically monitored using, for example, marine radars, cameras, wave gauges, GPS buoys, and submarine cable equipped with water pressure gauges. Marine radars are advantageous in that they can measure a current velocity on the sea surface over a wide range beyond visibility in a planar manner for each of a plurality of distances and a plurality of azimuths.

Non-Patent Literature 1 below discloses a radar signal processing system for detecting tsunamis by using a marine radar.

The radar signal processing apparatus divides the observation area into areas parallel to depth contours using the property that a tsunami travels in a direction perpendicular to the depth contours, and determines that a tsunami is present in a divided area when the current velocity or a change in the current velocity for the divided area is higher than or equal to a threshold.

CITATION LIST

Non-Patent Literature

Non-Patent Literature 1: "HF Radar Detection of Tsunamis," Journal of Oceanography, Vol. 62, pp. 705-716, 2006

SUMMARY OF INVENTION

Technical Problem

The conventional radar signal processing apparatus configured as described above has a problem of missing a tsunami or falsely detecting a tsunami in a case in which the sea floor has complex topographic features or the source of a tsunami is close to the coast because, in such case, the instantaneous direction of travel of a tsunami is not always perpendicular to the depth contours.

Another problem is that an accurate area in which a tsunami is present cannot be detected in a case in which the observation area is divided into an area larger than the resolution cell of the marine radar system in order to reduce local variations and noise.

Some embodiments according to this disclosure have been made in order to solve the above problems, and an object of the embodiments is to provide a radar signal processing apparatus and a radar signal processing method capable of preventing false detection of an observation target and improving accuracy of detecting an area in which the observation target is present.

Solution to Problem

A radar signal processing apparatus according to the present disclosure includes: a radio wave radiating unit for radiating radio waves toward an observation area; a radio wave receiving unit for receiving the radio waves radiated from the radio wave radiating unit and then reflected by the observation area; a Doppler velocity calculating unit for calculating a Doppler velocity for each of range cells obtained by dividing the observation area along a range direction and an azimuth direction from the radio waves received by the radio wave receiving unit; a coarse-resolution-area creating unit for dividing the observation area into coarse resolution areas each of which is an area larger than the range cell, and calculating a Doppler velocity for each coarse resolution area from the Doppler velocities for the range cells that are included in each coarse resolution area out of the Doppler velocities for the range cells calculated by the Doppler velocity calculating unit; and a range cell detecting unit for detecting a range cell in which an observation target is present from the Doppler velocity for each of the coarse resolution areas calculated by the coarse-resolution-area creating unit and the Doppler velocity for each of the range cells calculated by the Doppler velocity calculating unit.

Advantageous Effects of Invention

Some embodiments according to the present disclosure are configured such that the observation area is divided into the coarse resolution areas each being the area larger than the range cell, the coarse-resolution-area creating unit is provided to calculate the Doppler velocity for each coarse resolution area from the Doppler velocities for the range cells that are included in each coarse resolution area out of the Doppler velocities for the range cells calculated by the Doppler velocity calculating unit, and the range cell detecting unit detects a range cell in which the observation target is present from the Doppler velocity for each coarse resolution area calculated by the coarse-resolution-area creating unit and the Doppler velocities for the range cells calculated by the Doppler velocity calculating unit. Therefore, an effect of being able to prevent false detection of the observation target as well as improve the accuracy of detecting the area in which the observation target is present is provided.

BRIEF DESCRIPTION OF DRAWINGS

FIG. 4 is a hardware block diagram of a computer in a case in which the signal processor 8 is implemented by software, firmware, or the like.

FIG. 5 is a flowchart illustrating a radar signal processing method which is a processing procedure in a case in which the signal processor 8 is implemented by software, firmware, or the like.

DESCRIPTION OF EMBODIMENTS

Hereinafter, to explain this application in more detail, embodiments according to the present disclosure will now be described with reference to the drawings.

Embodiment 1

According to Embodiment 1, a radar signal processing apparatus observes a tsunami as an observation target.

Figure 1:
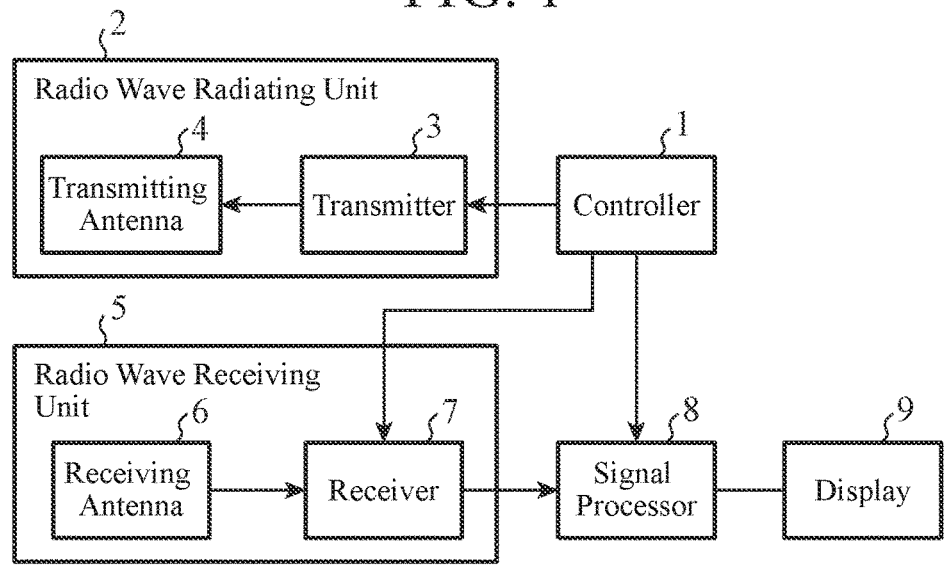
FIG. 1 is a block diagram illustrating a radar signal processing apparatus according to Embodiment 1 in the present disclosure.

FIG. 1 is a block diagram illustrating the radar signal processing apparatus according to Embodiment 1 in the present invention.

In FIG. 1, a controller 1 is implemented as, for example, a semiconductor integrated circuit on which a central processing unit (CPU) is mounted or a one-chip microcomputer, and outputs a timing signal indicating a transmission timing to a transmitter 3 as well as instructs the frequency and modulation scheme of a signal to transmit, the beam direction, and the like to the transmitter 3.

The controller 1 also outputs a timing signal indicating a reception timing and the beam direction to a receiver 7 and outputs, to a signal processor 8, a timing signal indicating a signal processing timing as well as signal processing parameters used to calculate a Doppler velocity, such as the number of received signals or the number of hits.

The radio wave radiating unit 2 includes the transmitter 3 and a transmitting antenna 4, and radiates radio waves toward the sea surface of an observation area.

The transmitter 3 generates a transmit signal with the frequency instructed by the controller 1, modulates the transmit signal with the modulation scheme instructed by the controller 1, and outputs the modulated transmit signal to the transmitting antenna 4 in synchronization with the timing signal output from the controller 1.

The transmitting antenna 4 radiates the transmit signal output from the transmitter 3 as radio waves toward the sea surface of the observation area.

The radio waves radiated from the transmitting antenna 4 can be of any kind, such as high frequency radio waves of about 3 to 30 MHz, very high frequency radio waves of about 30 to 300 MHz, or radio waves (microwaves) of about 4 to 12 GHz, for example.

A radio wave receiving unit 5 includes a receiving antenna 6 and the receiver 7, receives the radio waves radiated from the radio wave radiating unit 2 and then reflected by the sea surface in the observation area, and outputs a received signal of the radio waves to the signal processor 8.

The receiving antenna 6 receives the radio waves radiated from the radio wave radiating unit 2 and then reflected by the sea surface in the observation area.

The receiver 7 performs reception processing on the radio waves received by the receiving antenna 6 in synchronization with the timing signal output from the controller 1, and outputs the received signal of the radio waves to the signal processor 8.

The reception processing on the radio waves includes processing of demodulating the radio waves received by the receiving antenna 6 as well as processing of converting the frequency of the demodulated signal into the frequency instructed by the controller 1, processing of converting the signal after subjected to frequency conversion from an analog signal to a digital signal, and the like.

In FIG. 1, the transmitting antenna 4 and the receiving antenna 6 are provided separately. Alternatively, a transmitting/receiving antenna and a duplexer (transmit/receive switch) may be provided, and the duplexer may be configured to perform both radiation and reception of the radio waves.

The signal processor 8 performs processing of detecting an area in which a tsunami is present from the digital received signal output from the radio wave receiving unit 5.

A display 9 includes a liquid crystal display, for example, and displays the area in which a tsunami is present as detected by the signal processor 8 and other related information.

Figure 2:
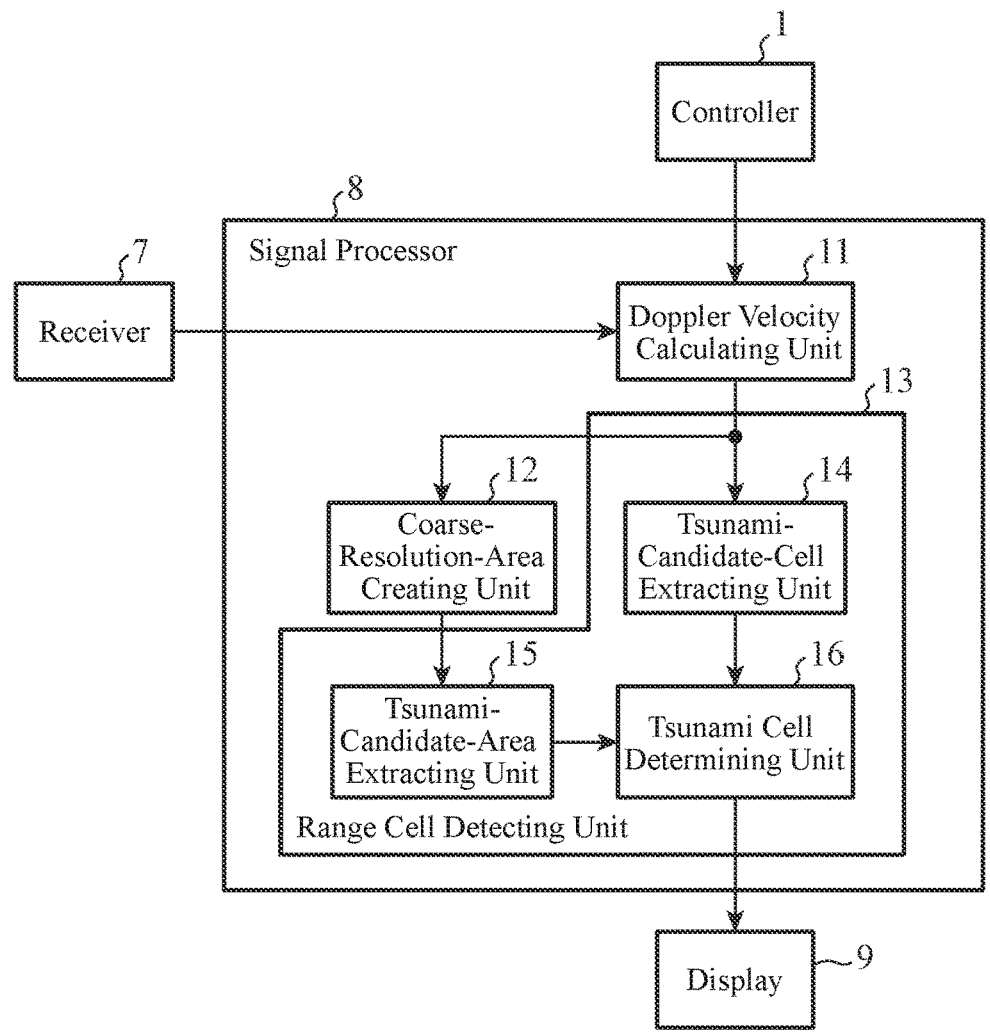
FIG. 2 is a block diagram illustrating a signal processor 8 of the radar signal processing apparatus according to Embodiment 1 in the present disclosure.
Figure 3:
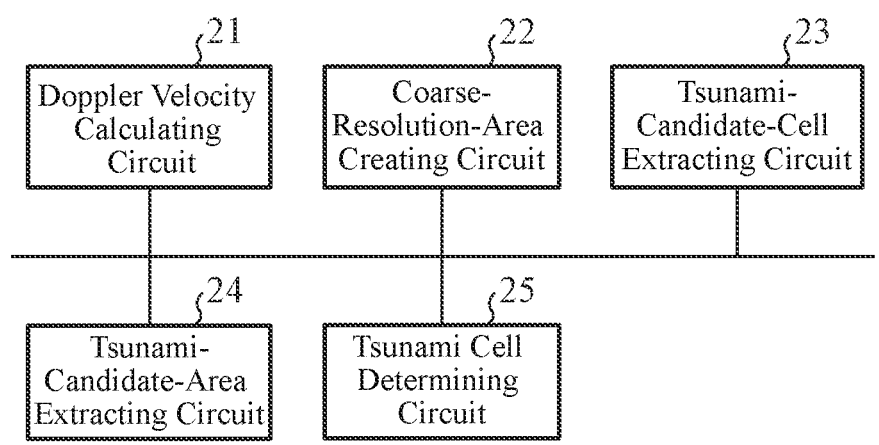
FIG. 3 is a hardware block diagram of the signal processor 8 in the radar signal processing apparatus according to Embodiment 1 in the present disclosure.

FIG. 2 is a block diagram illustrating the signal processor 8 of the radar signal processing apparatus according to Embodiment 1 in the present disclosure, and FIG. 3 is a hardware block diagram of the signal processor 8 in the radar signal processing apparatus according to Embodiment 1 in the present disclosure.

In FIGS. 2 and 3, a Doppler velocity calculating unit 11 is implemented by a Doppler velocity calculating circuit 21 in FIG. 3, for example, and performs processing that calculates Doppler velocities in range cells obtained by dividing the observation area along a range direction and an azimuth direction on the basis of the digital received signal output from the radio wave receiving unit 5.

The Doppler velocity for each of the range cells calculated by the Doppler velocity calculating unit 11 corresponds to a radial velocity of the ocean current velocity.

A coarse-resolution-area creating unit 12 is implemented by a coarse-resolution-area creating circuit 22 in FIG. 3, for example, and divides the observation area into coarse resolution areas each of which is an area larger than the range cell. The coarse-resolution-area creating unit 12 performs processing that calculates the Doppler velocity for each coarse resolution area from the Doppler velocities for the range cells that are included in each coarse resolution area, among the Doppler velocities for the range cells calculated by the Doppler velocity calculating unit 11.

A range cell detecting unit 13 includes a tsunami-candidate-cell extracting unit 14, a tsunami-candidate-area extracting unit 15, and a tsunami cell determining unit 16, thereby performing processing that detects a range cell in which a tsunami is present on the basis of the Doppler velocities in the coarse resolution areas calculated by the coarse-resolution-area creating unit 12 and the Doppler velocities for the range cells calculated by the Doppler velocity calculating unit 11.

The tsunami-candidate-cell extracting unit 14 is implemented by a tsunami-candidate-cell extracting circuit 23 in FIG. 3, for example, and performs processing that extracts, from among the range cells included in the observation area, one or more range cells in which a tsunami is likely to be present as tsunami candidate cells on the basis of the Doppler velocities for the range cells calculated by the Doppler velocity calculating unit 11.

That is, the tsunami-candidate-cell extracting unit 14 performs processing that extracts, from among the range cells included in the observation area, one or more range cells in which a change in the Doppler velocity calculated by the Doppler velocity calculating unit 11 is larger than or equal to a threshold $Th_1$ (a first threshold) as the tsunami candidate cells.

The tsunami-candidate-area extracting unit 15 is implemented by a tsunami-candidate-area extracting circuit 24 in FIG. 3, for example, and performs processing that extracts, from among the coarse resolution areas included in the observation area, one or more coarse resolution area in which a tsunami is likely to be present as tsunami candidate areas on the basis of the Doppler velocities in the coarse resolution areas calculated by the coarse-resolution-area creating unit 12.

The tsunami cell determining unit 16 is implemented by a tsunami cell determining circuit 25 in FIG. 3, for example, and performs processing of determining that a tsunami candidate cell of interest extracted by the tsunami-candidate-cell extracting unit 14 is a range cell in which a tsunami is present when the tsunami candidate cell is included in a coarse resolution area of interest extracted by the tsunami-candidate-area extracting unit 15.

The Doppler velocity calculating unit 11, the coarse-resolution-area creating unit 12, the tsunami-candidate-cell extracting unit 14, the tsunami-candidate-area extracting unit 15, and the tsunami cell determining unit 16 which are elements of the signal processor 8 in FIG. 2 are assumed to be implemented by dedicated hardware illustrated in FIG. 3, or by the Doppler velocity calculating circuit 21, the coarse-resolution-area creating circuit 22, the tsunami-candidate-cell extracting circuit 23, the tsunami-candidate-area extracting circuit 24, and the tsunami cell determining circuit 25, respectively.

Moreover, the Doppler velocity calculating circuit 21, the coarse-resolution-area creating circuit 22, the tsunami-candidate-cell extracting circuit 23, the tsunami-candidate-area extracting circuit 24, and the tsunami cell determining circuit 25 are implemented as any of a single circuit, a composite circuit, a programmed processor, a parallel-programmed processor, an application specific integrated circuit (ASIC), and a field-programmable gate array (FPGA), or a combination thereof, for example.

Note that the components of the signal processor 8 may be implemented by not only the dedicated hardware but also software, firmware, or a combination of software and firmware.

The software or firmware is stored as one or more programs in a memory of a computer. The computer refers to hardware for executing one or more programs and implemented as a central processing unit (CPU), a processing unit, an arithmetic unit, a microprocessor, a microcomputer, a processor, a digital signal processor (DSP), or the like, for example.

The memory of the computer is a nonvolatile or volatile semiconductor memory, such as a random access memory (RAM), a read only memory (ROM), a flash memory, an erasable programmable read only memory (EPROM), or an electrically erasable programmable read only memory (EEPROM), a magnetic disc, a flexible disc, an optical disc, a compact disc, a mini disc, a digital versatile disc (DVD), or the like.

Figure 4:
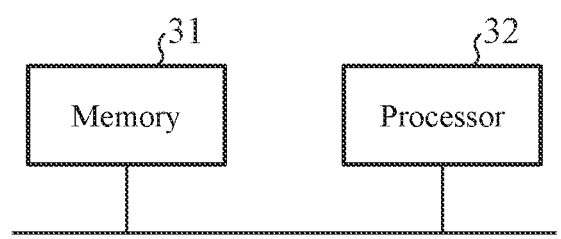

FIG. 4 is a hardware block diagram of the computer in a case in which the signal processor 8 is implemented by software, firmware, or the like.

In a case in which the signal processor 8 is implemented by software, firmware, or the like, a memory 31 stores one or more programs that cause the computer to execute the processing procedure of the Doppler velocity calculating unit 11, the coarse-resolution-area creating unit 12, the tsunami-candidate-cell extracting unit 14, the tsunami-candidate-area extracting unit 15, and the tsunami cell determining unit 16 so that a processor 32 of the computer may execute the one or more programs stored in the memory 31.

Figure 5:
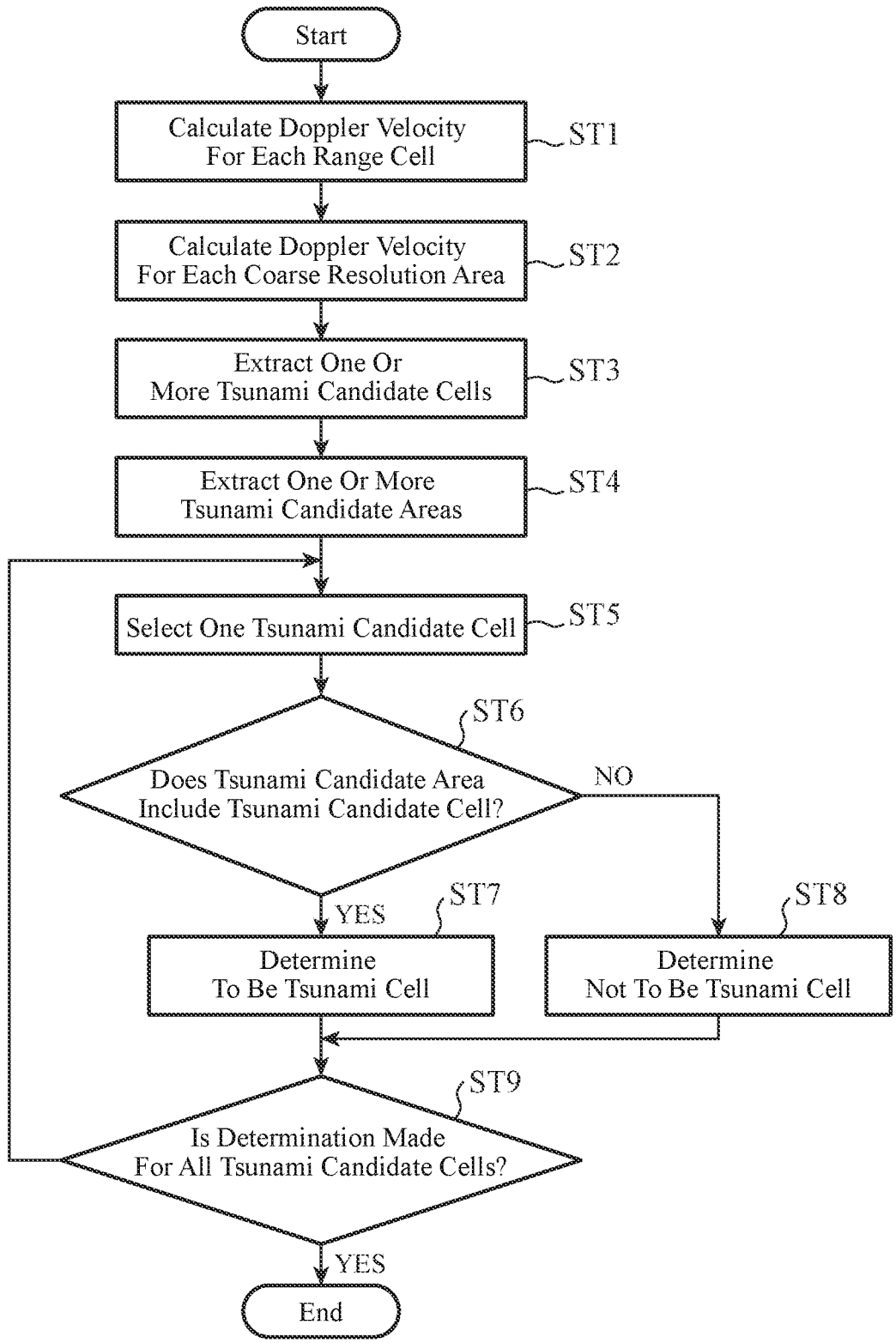

FIG. 5 is a flowchart illustrating a radar signal processing method which is the processing procedure in the case in which the signal processor 8 is implemented by software, firmware, or the like.

Although FIG. 3 illustrates the example in which each of the components of the signal processor 8 is implemented by the dedicated hardware and FIG. 4 illustrates the example in which the signal processor 8 is implemented by the software, firmware, or the like, some of the elements of the signal processor 8 may be implemented by dedicated hardware while the rest of the elements may be implemented by software, firmware, or the like.

Next, the operation will be described.

The transmitter 3 of the radio wave radiating unit 2 generates a transmit signal at the frequency instructed by the controller 1, modulates the transmit signal with the modulation scheme instructed by the controller 1, and outputs the transmit signal being modulated to the transmitting antenna 4 in synchronization with the timing signal output from the controller 1.

The transmitting antenna 4 of the radio wave radiating unit 2 radiates the transmit signal output from the transmitter 3 as radio waves toward the sea surface of the observation area.

The radio waves are assumed to be uniformly radiated toward the sea surface of the observation area in Embodiment 1, but may be radiated in turn toward each of a plurality of narrow areas included in the observation area.

The receiving antenna 6 of the radio wave receiving unit 5 receives the radio waves radiated from the radio wave radiating unit 2 and then reflected by the sea surface of the observation area.

The receiver 7 of the radio wave receiving unit 5 performs reception processing on the radio waves received by the receiving antenna 6 in synchronization with the timing signal output from the controller 1, and outputs the received signal of the radio waves to the signal processor 8.

That is, the receiver 7 demodulates the radio waves received by the receiving antenna 6 in synchronization with the timing signal output from the controller 1, and converts the frequency of the demodulated signal into the frequency instructed by the controller 1.

The receiver 7 further converts the signal after subjected to the frequency conversion from the analog signal to the digital signal, and outputs the digital received signal to the signal processor 8.

Upon receiving the digital received signal from the receiver 7 of the radio wave receiving unit 5, the Doppler velocity calculating unit 11 of the signal processor 8 calculates the Doppler velocity for each of the range cells from the digital received signal in synchronization with the timing signal output from the controller 1, the range cells being obtained by dividing the observation area along the range direction and the azimuth direction (step ST1 in FIG. 5).

The Doppler velocity for each of the range cells is calculated by performing signal processing, such as Fourier transform, on the received signal on the basis of the signal processing parameters, such as the number of received signals, which are provided from the signal processor 8. The processing of calculating the Doppler velocity is a well-known technique as disclosed in Non-Patent Literature 2 below, for example, and thus will not be described in detail.

Figure 6:
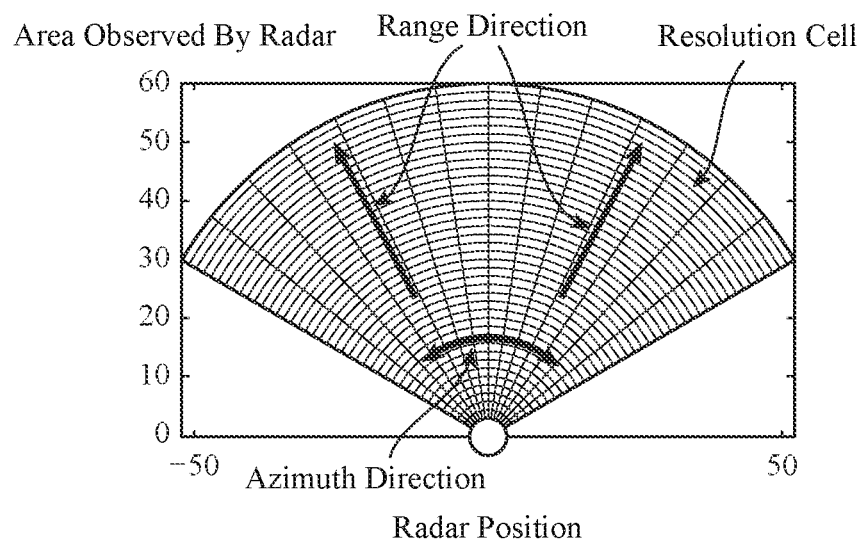
FIG. 6 is an explanatory diagram illustrating range cells obtained by dividing an observation area along a range direction and an azimuth direction.

[Non-Patent Literature 2]
"Coastal Marine Observation by Land-Based Radar", published on Mar. 10, 2001 by Japan Society of Civil Engineers Here, FIG. 6 is an explanatory diagram illustrating the range cells obtained by dividing the observation area along the range direction and the azimuth direction.

FIG. 6 illustrates an example in which the azimuth direction which is the beam direction is divided into fourteen cells, and the range direction is divided into forty cells.

FIG. 6 thus illustrates an example in which the number of the range cells as resolution cells is 560 (=14×40).

Upon receiving the digital received signal from the receiver 7 of the radio wave receiving unit 5, the coarse-resolution-area creating unit 12 divides the observation area into coarse resolution areas each of which is an area larger than the range cell.

For example, under the instruction of the controller 1, the observation area is divided into the coarse resolution areas each including two range cells in the azimuth direction and four range cells in the range direction.

Although any number of the range cells may be included in the coarse resolution area, the number is assumed to be set such that the size of the coarse resolution area is one half or one quarter of the spatial size of a tsunami.

The spatial size of a tsunami is several kilometers to several hundreds of kilometers, whereby the number of the range cells is assumed to be set such that the size of the coarse resolution area equals several kilometers to 50 km or 25 km, for example. This can reduce noise, an estimation error of the current velocity, and the like being local undesired waves included in the range cell as the resolution cell. Moreover, a tsunami can be detected on the basis of a characteristic of the spatial size of the tsunami, whereby the performance of detecting the tsunami can be improved.

Figure 7:
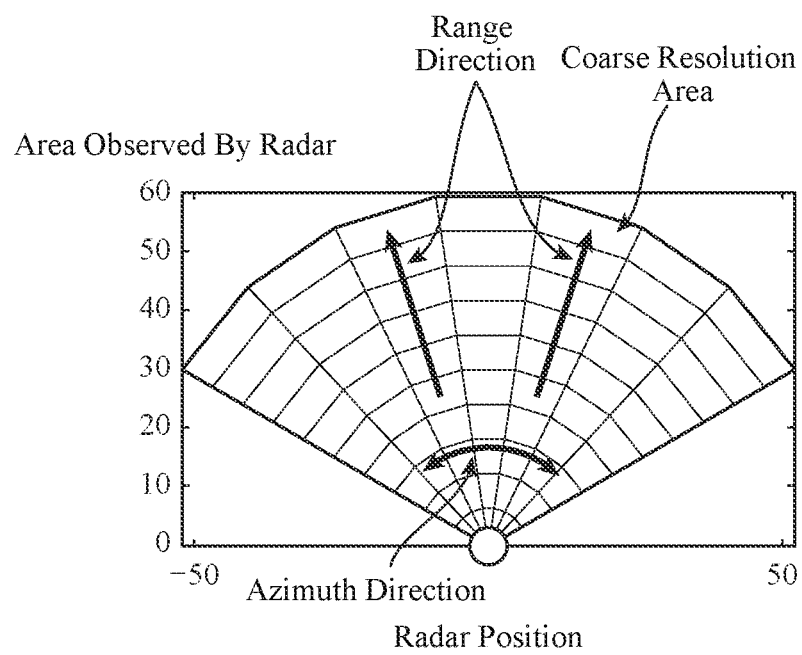
FIG. 7 is an explanatory diagram illustrating coarse resolution areas obtained by dividing the observation area along the range direction and the azimuth direction.

FIG. 7 is an explanatory diagram illustrating the coarse resolution areas obtained by dividing the observation area along the range direction and the azimuth direction.

FIG. 7 illustrates an example in which the azimuth direction which is the beam direction is divided into seven areas, and the range direction is divided into ten areas.

FIG. 7 thus illustrates an example in which the number of the coarse resolution areas is 70 (=7×10).

The coarse-resolution-area creating unit 12 divides the observation area into the coarse resolution areas and then calculates the Doppler velocity for each coarse resolution area from the Doppler velocities for the range cells that are included in each coarse resolution area, among the Doppler velocities for the range cells that are calculated by the Doppler velocity calculating unit 11 (step ST2 in FIG. 5).

In the case where the observation area is divided into coarse resolution areas each including two range cells in the azimuth directions and four range cells in the range direction, for example, the Doppler velocity for the coarse resolution area can be calculated to be a mean, a median, or a difference between the maximum value and the minimum value of the Doppler velocities in eight (=2×4) range cells included in the coarse resolution area.

Embodiment 1 illustrates an example in which the coarse-resolution-area creating unit 12 calculates the Doppler velocity for the coarse resolution area by using the Doppler velocities for the range cells calculated by the Doppler velocity calculating unit 11.

While the Doppler velocity for each of the range cells calculated by the Doppler velocity calculating unit 11 is the radial velocity of the ocean current velocity itself, the Doppler velocity for the coarse resolution area may be calculated using the radial velocity of the ocean current velocity from which a current velocity component periodically different from a tsunami such as a tide or waves is subtracted.

Embodiment 1 also assumes that the observation area is divided in a state in which boundaries of adjacent coarse resolution areas are in contact with each other such that the adjacent coarse resolution areas do not overlap each other. However, the observation area may be divided such that half of each of the adjacent coarse resolution areas overlaps each other.

The performance of detecting a range cell in which a tsunami is present can be improved by dividing the observation area such that the adjacent coarse resolution areas overlap each other. When the mean or the like of the Doppler velocities in the plurality of range cells included in the coarse resolution area is calculated in order to calculate the Doppler velocity for the coarse resolution area, for example, current velocity components of a tsunami may cancel each other. However, the cancellation of the current velocity components of a tsunami can be avoided by dividing the observation area such that the adjacent coarse resolution areas overlap each other, whereby the performance of detecting a range cell in which a tsunami is present can be improved.

Once the Doppler velocity calculating unit 11 calculates the Doppler velocities for the range cells, the tsunami-candidate-cell extracting unit 14 extracts a range cell in which a tsunami is likely to be present as a tsunami candidate cell on the basis of the Doppler velocities for the range cells, and outputs the tsunami candidate cell to the tsunami cell determining unit 16 (step ST3 in FIG. 5).

A tsunami has a characteristic that a change in the current velocity is larger than that of a tide or the like other than the tsunami. As a result, a range cell with a large change in the Doppler velocity can be extracted as the tsunami candidate cell.

The processing of extracting the tsunami candidate cell by the tsunami-candidate-cell extracting unit 14 will be specifically described below.

For each range cell included in the observation area, the tsunami-candidate-cell extracting unit 14 calculates a difference in velocity between the latest Doppler velocity calculated by the Doppler velocity calculating unit 11 and the Doppler velocity calculated a certain time ago by the Doppler velocity calculating unit 11.

The tsunami-candidate-cell extracting unit 14 then extracts a range cell with the difference in velocity larger than or equal to the threshold $Th_1$ as the tsunami candidate cell from among the range cells included in the observation area, and outputs the tsunami candidate cell to the tsunami cell determining unit 16.

Note that the threshold $Th_1$ is a value set beforehand in consideration of a difference between the change in the current velocity of a tsunami and the change in the current velocity of a tide or the like other than the tsunami, and is set to an intermediate value between estimated changes in the current velocity of a tide and in the current velocity of a tsunami, for example.

Once the coarse-resolution-area creating unit 12 calculates the Doppler velocities in the coarse resolution areas, the tsunami-candidate-area extracting unit 15 extracts, from among the coarse resolution areas included in the observation area, a coarse resolution area in which a tsunami is likely to be present as a tsunami candidate area on the basis of the Doppler velocities in the coarse resolution areas, and outputs the tsunami candidate area to the tsunami cell determining unit 16 (step ST4 in FIG. 5).

That is, the tsunami-candidate-area extracting unit 15 extracts a coarse resolution area with the Doppler velocity higher than or equal to a threshold $Th_0$ as the tsunami candidate area from among the coarse resolution areas included in the observation area, and outputs the tsunami candidate area to the tsunami cell determining unit 16.

Note that the threshold $Th_0$ is a value set beforehand in consideration of a difference between the current velocity of a tsunami and the current velocity of a tide or the like other than the tsunami, and is set to an intermediate value between estimated current velocities of a tide and a tsunami, for example.

Upon receiving the tsunami candidate cell from the tsunami-candidate-cell extracting unit 14, the tsunami cell determining unit 16 determines that the tsunami candidate cell is the range cell (hereinafter referred to as a "tsunami cell") in which a tsunami is present if the tsunami candidate cell is included in the coarse resolution area of interest output from the tsunami-candidate-area extracting unit 15.

The determination processing by the tsunami cell determining unit 16 will be specifically described below.

When receiving one or more tsunami candidate cells from the tsunami-candidate-cell extracting unit 14, the tsunami cell determining unit 16 selects one tsunami candidate cell that is not yet subjected to determination from among the one or more tsunami candidate cells (step ST5 in FIG. 5).

Upon selecting the tsunami candidate cell, the tsunami cell determining unit 16 determines whether or not a tsunami candidate area including the selected tsunami candidate cell exists in tsunami candidate areas output from the tsunami-candidate-area extracting unit 15 (step ST6 in FIG. 5).

Note that the tsunami candidate cell output from the tsunami-candidate-cell extracting unit 14 is assumed to include information indicating the position of the tsunami candidate cell in the range direction and the azimuth direction, and the tsunami candidate area output from the tsunami-candidate-area extracting unit 15 is assumed to include information indicating the position of the tsunami candidate area in the range direction and the azimuth direction. Accordingly, it can be determined whether the tsunami candidate area including the selected tsunami candidate cell is present or not by comparing the position of the selected tsunami candidate cell and the position of the tsunami candidate area output from the tsunami-candidate-area extracting unit 15.

The tsunami cell determining unit 16 determines that the selected tsunami candidate cell is the tsunami cell (step ST7 in FIG. 5) if the selected tsunami candidate cell is included in the tsunami candidate area of interest output from the tsunami-candidate-area extracting unit 15 (YES in step ST6 of FIG. 5).

The tsunami cell determining unit 16 determines that the selected tsunami candidate cell is not the tsunami cell (step ST8 in FIG. 5) if the selected tsunami candidate cell is not included in the tsunami candidate area of interest output from the tsunami-candidate-area extracting unit 15 (NO in step ST6 of FIG. 5).

The processing from steps ST5 to ST8 is repeated until all the tsunami candidate cells output from the tsunami-candidate-cell extracting unit 14 are determined to be or not to be the tsunami cell (step ST9 in FIG. 5). That is, the processing returns to step ST5 if there remains a tsunami candidate cell that is not yet determined to be or not to be the tsunami cell (NO in step ST9 of FIG. 5).

After all the tsunami candidate cells are determined to be or not to be the tsunami cell (YES in step ST9 of FIG. 5), the tsunami cell determining unit 16 outputs, to the display 9, tsunami information including, for example, the information that indicates the position in the range direction and the azimuth direction of the tsunami candidate cell determined to be the tsunami cell, and/or information that indicates the time at which the received signal being the source of detection of the tsunami cell is output from the radio wave receiving unit 5.

Here, the tsunami information includes the information indicating the time at which the received signal is output from the radio wave receiving unit 5, but may include information indicating the time at which the radio wave receiving unit 5 receives the radio waves or the time at which the radio wave radiating unit 2 radiates the radio waves.

The display 9 displays information, such as the position and time related to the tsunami cell which is the area in which a tsunami is present on the basis of the tsunami information output from the tsunami cell determining unit 16 of the signal processor 8, and a change in the position of the tsunami cell in which a tsunami is present.

As described above clearly, according to Embodiment 1, the configuration is such that the observation area is divided into the coarse resolution areas each being the area larger than the range cell, the coarse-resolution-area creating unit 12 is provided to calculate the Doppler velocity for each coarse resolution area on the basis of the Doppler velocities in the plurality of range cells included in each coarse resolution area among the Doppler velocities for the range cells calculated by the Doppler velocity calculating unit 11, and the range cell detecting unit 13 detects the range cell in which the observation target is present from the Doppler velocity for each coarse resolution area calculated by the coarse-resolution-area creating unit 12 and the Doppler velocities for the range cells calculated by the Doppler velocity calculating unit 11. Such a configuration thus has the effect of being able to prevent false detection of the observation target as well as improve the accuracy of detecting the area in which the observation target is present.

That is, the Doppler velocities for the range cells calculated by the Doppler velocity calculating unit alone cannot grasp the spatial characteristics of a tsunami and thus possibly result in a false determination that a range cell in which a tsunami is not present is determined as the tsunami cell. In Embodiment 1, however, the tsunami candidate area is detected as the range of existence of a tsunami spreading spatially on the basis of the Doppler velocity for each coarse resolution area, whereby a probability of falsely determining that a range cell in which a tsunami is not present is the tsunami cell can be decreased even when the sea floor has complex topographic features or when the source of a tsunami is close to the coast.

Note that the tsunami cell determining unit 16 outputs the tsunami cell by the range cell, whereby a spatial distribution profile of the tsunami area can be represented accurately.

Embodiment 2

In Embodiment 1, the tsunami-candidate-cell extracting unit 14 extracts the range cell in which the change in the Doppler velocity calculated by the Doppler velocity calculating unit 11 is larger than or equal to the threshold $Th_1$ as the tsunami candidate cell from among the range cells included in the observation area. A Embodiment 2, on the other hand, will describe a case where a range cell is extracted as the tsunami candidate cell when a change in the Doppler velocity calculated by the Doppler velocity calculating unit 11 in the range cell is larger than or equal to the threshold $Th_1$ and the Doppler velocity is higher than or equal to a threshold $Th_2$ (a second threshold).

Figure 8:
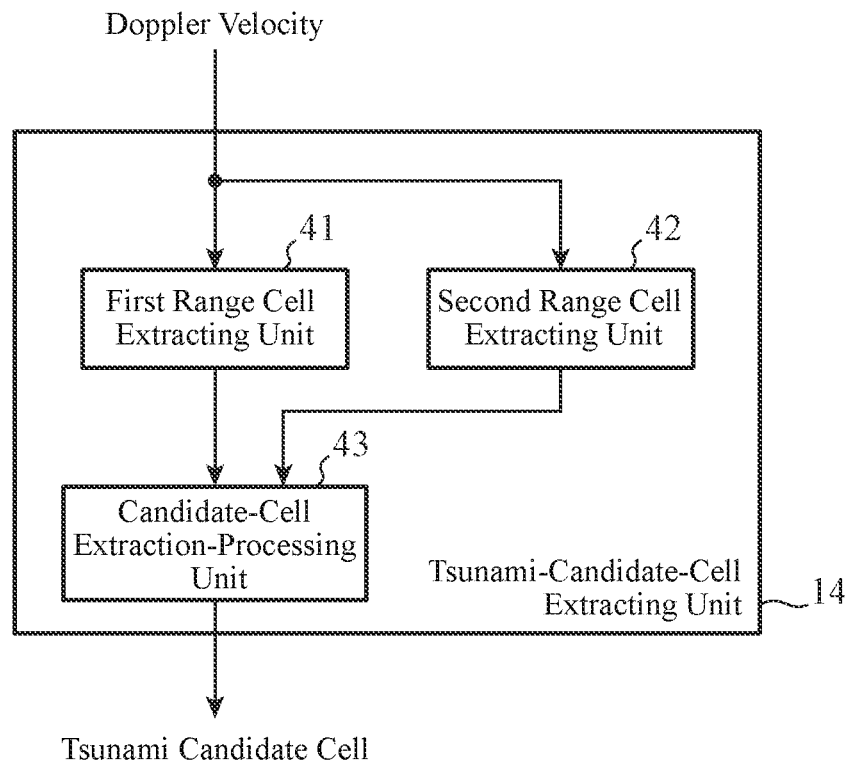
FIG. 8 is a block diagram illustrating a tsunami-candidate-cell extracting unit 14 of a radar signal processing apparatus according to Embodiment 2 in the present disclosure.

FIG. 8 is a block diagram illustrating a tsunami-candidate-cell extracting unit 14 of a radar signal processing apparatus according to Embodiment 2 in the present disclosure.

In FIG. 8, a first range cell extracting unit 41 performs processing that extracts, from among range cells included in an observation area, a range cell in which a change in the Doppler velocity calculated by the Doppler velocity calculating unit 11 is larger than or equal to the threshold $Th_1$ (the first threshold).

A second range cell extracting unit 42 performs processing that extracts, from among the range cells included in the observation area, a range cell in which the Doppler velocity calculated by the Doppler velocity calculating unit 11 is higher than or equal to the threshold $Th_2$ (the second threshold).

A candidate-cell extraction-processing unit 43 performs processing that extracts the range cell extracted by both the first range cell extracting unit 41 and the second range cell extracting unit 42 as the tsunami candidate cell.

Next, the operation will be described.

As in Embodiment 1, the tsunami-candidate-cell extracting unit 14 extracts a range cell in which a tsunami is likely to be present as the tsunami candidate cell from among the range cells included in the observation area, but the specific processing for extracting the tsunami candidate cell is different from that in Embodiment 1.

As with the tsunami-candidate-cell extracting unit 14 in Embodiment 1, the first range cell extracting unit 41 of the tsunami-candidate-cell extracting unit 14 extracts, from among the range cells included in the observation area, a range cell in which a change in the Doppler velocity calculated by the Doppler velocity calculating unit 11 is larger than or equal to the threshold $Th_1$.

The second range cell extracting unit 42 of the tsunami-candidate-cell extracting unit 14 extracts, from among the range cells included in the observation area, a range cell in which the Doppler velocity calculated by the Doppler velocity calculating unit 11 is higher than or equal to the threshold $Th_2$.

The threshold $Th_2$ is a value set beforehand in consideration of a difference between the current velocity of a tsunami and the current velocity of a tide or the like other than the tsunami, and is set to an intermediate value between estimated current velocities of a tide and a tsunami, for example.

The candidate-cell extraction-processing unit 43 of the tsunami-candidate-cell extracting unit 14 extracts the range cell extracted by both the first range cell extracting unit 41 and the second range cell extracting unit 42 as the tsunami candidate cell.

Thus, the intersection of the range cell extracted by the first range cell extracting unit 41 and the range cell extracted by the second range cell extracting unit 42 is determined as the tsunami candidate cell, whereby the number of range cells extracted by mistake can be decreased even when the first range cell extracting unit 41 falsely extracts a range cell in which a tsunami is not present due to the threshold $Th_1$ being small or when the second range cell extracting unit 42 falsely extracts a range cell in which a tsunami is not present due to the threshold $Th_2$ being small, for example.

As described above clearly, according to Embodiment 2, the configuration is such that the tsunami-candidate-cell extracting unit 14 includes the first range cell extracting unit 41 that extracts, from the range cells included in the observation area, the range cell in which the change in the Doppler velocity calculated by the Doppler velocity calculating unit 11 is larger than or equal to the threshold $Th_1$, the second range cell extracting unit 42 that extracts, from the range cells included in the observation area, the range cell in which the Doppler velocity calculated by the Doppler velocity calculating unit 11 is higher than or equal to the threshold $Th_2$, and the candidate-cell extraction-processing unit 43 that extracts the range cell extracted by both the first range cell extracting unit 41 and the second range cell extracting unit 42 as the tsunami candidate cell. Such a configuration thus has the effect of being able to prevent the issuance of a false alarm associated with false extraction of a range cell in which a tsunami is not present.

Embodiment 3

In Embodiment 2, the tsunami-candidate-cell extracting unit 14 extracts the range cell in which the change in the Doppler velocity calculated by the Doppler velocity calculating unit 11 is larger than or equal to the threshold $Th_1$ and the Doppler velocity is higher than or equal to the threshold $Th_2$ as the tsunami candidate cell. Embodiment 3, on the other hand, will describe a case where a range cell in which a change in the Doppler velocity calculated by the Doppler velocity calculating unit 11 is larger than or equal to the threshold $Th_1$ is extracted as the tsunami candidate cell and a range cell in which the Doppler velocity is higher than or equal to the threshold $Th_2$ is extracted as the tsunami candidate cell.

Figure 9:
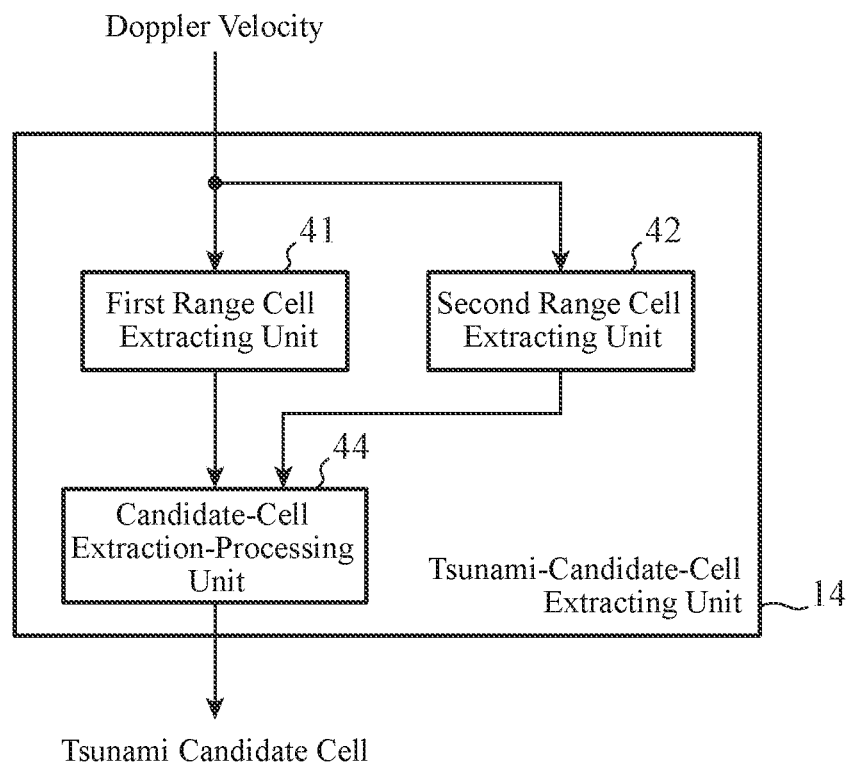
FIG. 9 is a block diagram illustrating the tsunami-candidate-cell extracting unit 14 of the radar signal processing apparatus according to Embodiment 3 in the present disclosure.

FIG. 9 is a block diagram illustrating a tsunami-candidate-cell extracting unit 14 of a radar signal processing apparatus according to Embodiment 3 in the present disclosure where, in FIG. 9, a part identical or equivalent to that of FIG. 8 is denoted by the same reference numeral as that assigned to such part in FIG. 8 and thus will not be described.

A candidate-cell extraction-processing unit 44 performs processing that extracts the range cell extracted by the first range cell extracting unit 41 as the tsunami candidate cell and also extracts the range cell extracted by the second range cell extracting unit 42 as the tsunami candidate cell.

Next, the operation will be described.

As in Embodiments 1 and 2, the tsunami-candidate-cell extracting unit 14 extracts a range cell in which a tsunami is likely to be present as the tsunami candidate cell from among the range cells included in the observation area, but the specific processing for extracting the tsunami candidate cell is different from that in Embodiments 1 and 2.

As with Embodiment 2, the first range cell extracting unit 41 of the tsunami-candidate-cell extracting unit 14 extracts, from among the range cells included in the observation area, a range cell in which a change in the Doppler velocity calculated by the Doppler velocity calculating unit 11 is larger than or equal to the threshold $Th_1$.

As with Embodiment 2, the second range cell extracting unit 42 of the tsunami-candidate-cell extracting unit 14 extracts, from among the range cells included in the observation area, a range cell in which the Doppler velocity calculated by the Doppler velocity calculating unit 11 is higher than or equal to the threshold $Th_2$.

The candidate-cell extraction-processing unit 44 of the tsunami-candidate-cell extracting unit 14 extracts the range cell extracted by the first range cell extracting unit 41 as the tsunami candidate cell and also extracts the range cell extracted by the second range cell extracting unit 42 as the tsunami candidate cell.

Thus, the union of the range cell extracted by the first range cell extracting unit 41 and the range cell extracted by the second range cell extracting unit 42 is determined as the tsunami candidate cell, whereby a range cell that is missed can be extracted even when the first range cell extracting unit 41 misses a range cell in which a tsunami is present due to the threshold $Th_1$ being large or when the second range cell extracting unit 42 misses a range cell in which a tsunami is present due to the threshold $Th_2$ being large, for example.

As described above clearly, according to Embodiment 3, the configuration is such that the tsunami-candidate-cell extracting unit 14 includes the first range cell extracting unit 41 that extracts, from the range cells included in the observation area, the range cell in which the change in the Doppler velocity calculated by the Doppler velocity calculating unit 11 is larger than or equal to the threshold $Th_1$, the second range cell extracting unit 42 that extracts, from the range cells included in the observation area, the range cell in which the Doppler velocity calculated by the Doppler velocity calculating unit 11 is higher than or equal to the threshold $Th_2$, and the candidate-cell extraction-processing unit 44 that extracts the range cell extracted by the first range cell extracting unit 41 as the tsunami candidate cell and also extracts the range cell extracted by the second range cell extracting unit 42 as the tsunami candidate cell. Such a configuration thus has the effect of being able to prevent reduction in the accuracy of detecting a tsunami as a result of missing a range cell in which a tsunami is present. Another effect is that a tsunami with a small Doppler velocity can also be detected.

Embodiment 4

Embodiment 2 extracts the intersection of the range cell extracted by the first range cell extracting unit 41 and the range cell extracted by the second range cell extracting unit 42 as the tsunami candidate cell, and Embodiment 3 extracts the union of the range cell extracted by the first range cell extracting unit 41 and the range cell extracted by the second range cell extracting unit 42 as the tsunami candidate cell.

Embodiment 4 will describe a case where the intersection is determined as the tsunami candidate cell when the magnitude of a range of the Doppler velocities in the observation area is larger than or equal to a threshold $Th_3$ (a third threshold), or the union is determined as the tsunami candidate cell when the range of the Doppler velocities in the observation area is smaller than the threshold $Th_3$.

Figure 10:
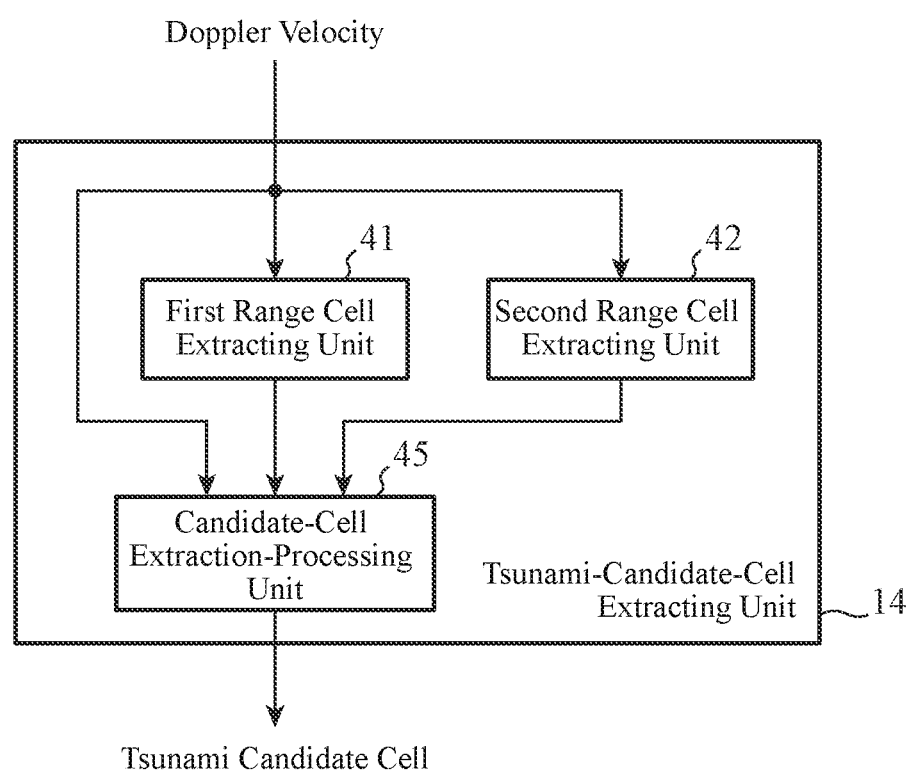
FIG. 10 is a block diagram illustrating the tsunami-candidate-cell extracting unit 14 of the radar signal processing apparatus according to Embodiment 4 in the present disclosure.

FIG. 10 is a block diagram illustrating a tsunami-candidate-cell extracting unit 14 of a radar signal processing apparatus according to the Embodiment 4 of the present invention where, in FIG. 10, a part identical or equivalent to that of FIGS. 8 and 9 is denoted by the same reference numeral as that assigned to such part in FIGS. 8 and 9 and thus will not be described.

A candidate-cell extraction-processing unit 45 performs processing that calculates the magnitude of the range of the Doppler velocities in the observation area, that is, a difference between the maximum value and the minimum value of the Doppler velocities in the observation area, on the basis of the Doppler velocities for the range cells calculated by the Doppler velocity calculating unit 11.

The candidate-cell extraction-processing unit 45 further performs processing that extracts, as the tsunami candidate cell, the range cell extracted by both the first range cell extracting unit 41 and the second range cell extracting unit 42 when the difference between the maximum value and the minimum value of the Doppler velocities in the observation area is larger than or equal to the threshold $Th_3$ (the third threshold).

The candidate-cell extraction-processing unit 45 performs processing that extracts the range cell extracted by the first range cell extracting unit 41 as the tsunami candidate cell and also extracts the range cell extracted by the second range cell extracting unit 42 as the tsunami candidate cell when the difference between the maximum value and the minimum value of the Doppler velocities in the observation area is smaller than the threshold $Th_3$.

Next, the operation will be described.

As in Embodiments 1-3, the tsunami-candidate-cell extracting unit 14 extracts a range cell in which a tsunami is likely to be present as the tsunami candidate cell from among the range cells included in the observation area, but the specific processing for extracting the tsunami candidate cell is different from that in Embodiments 1-3.

As with Embodiments 2 and 3, the first range cell extracting unit 41 of the tsunami-candidate-cell extracting unit 14 extracts, from among the range cells included in the observation area, a range cell in which a change in the Doppler velocity calculated by the Doppler velocity calculating unit 11 is larger than or equal to the threshold $Th_1$.

As with Embodiments 2 and 3, the second range cell extracting unit 42 of the tsunami-candidate-cell extracting unit 14 extracts, from among the range cells included in the observation area, a range cell in which the Doppler velocity calculated by the Doppler velocity calculating unit 11 is higher than or equal to the threshold $Th_2$.

The candidate-cell extraction-processing unit 45 calculates the magnitude of the range of the Doppler velocities in the observation area, that is, the difference between the maximum value and the minimum value of the Doppler velocities in the observation area, on the basis of the Doppler velocities for the range cells calculated by the Doppler velocity calculating unit 11.

At this time, the number of range cells in which the Doppler velocity is higher than or equal to the threshold $Th_2$ decreases when the current velocity of a tsunami is relatively low, for example, whereby more range cells in which a tsunami is present are expected to be missed. The difference between the maximum value and the minimum value of the Doppler velocities is also expected to be decreased.

In such a case, the union of the range cell extracted by the first range cell extracting unit 41 and the range cell extracted by the second range cell extracting unit 42 is extracted as the tsunami candidate cell, whereby the number of missed range cells in which a tsunami is present can be decreased.

On the other hand, the number of range cells in which the Doppler velocity is higher than or equal to the threshold $Th_2$ increases when the current velocity of a tsunami is relatively high, whereby more range cells in which a tsunami is not present are expected to be detected by mistake. The difference between the maximum value and the minimum value of the Doppler velocities is also expected to be increased.

In such a case, the intersection of the range cell extracted by the first range cell extracting unit 41 and the range cell extracted by the second range cell extracting unit 42 is extracted as the tsunami candidate cell, whereby the number of falsely detected range cells in which a tsunami is not present can be decreased.

Accordingly, the candidate-cell extraction-processing unit 45 extracts the range cell extracted by both the first range cell extracting unit 41 and the second range cell extracting unit 42 as the tsunami candidate cell when the difference between the maximum value and the minimum value of the Doppler velocities in the observation area is larger than or equal to the threshold $Th_3$.

The candidate-cell extraction-processing unit 45 extracts the range cell extracted by the first range cell extracting unit 41 as the tsunami candidate cell and also extracts the range cell extracted by the second range cell extracting unit 42 as the tsunami candidate cell when the difference between the maximum value and the minimum value of the Doppler velocities in the observation area is smaller than the threshold $Th_3$.

Note that the threshold $Th_3$ is a preset value and is set to an intermediate value between a difference assumed when a tsunami is not generated and a difference assumed when a tsunami is generated, for example.

As described above clearly, according to Embodiment 4, the configuration is such that the tsunami-candidate-cell extracting unit 14 includes the first range cell extracting unit 41 that extracts, from the range cells included in the observation area, the range cell in which the change in the Doppler velocity calculated by the Doppler velocity calculating unit 11 is larger than or equal to the threshold $Th_1$, and the second range cell extracting unit 42 that extracts, from the range cells included in the observation area, the range cell in which the Doppler velocity calculated by the Doppler velocity calculating unit 11 is higher than or equal to the threshold $Th_2$. With such configuration, the tsunami-candidate-cell extracting unit 14 calculates the magnitude of the range of the Doppler velocities in the observation area from the Doppler velocities for the range cells calculated by the Doppler velocity calculating unit 11 and extracts, as the tsunami candidate cell, the range cell extracted by both the first range cell extracting unit 41 and the second range cell extracting unit 42 when the magnitude of the range is larger than or equal to the threshold $Th_3$ or extracts the range cell extracted by the first range cell extracting unit 41 as the tsunami candidate cell and the range cell extracted by the second range cell extracting unit 42 as the tsunami candidate cell when the magnitude of the range is smaller than the threshold $Th_3$, thereby obtaining the effect similar to that of Embodiments 1-3 and being able to improve the accuracy of detecting a tsunami more than Embodiments 1-3.

Embodiments 1-4 above need not use information on the topographic features of the sea floor for detecting a tsunami, thereby requiring no memory that stores the information on the topographic features of the sea floor and being able to reduce the cost of the radar signal processing apparatus.

Embodiments 1-4 above illustrate the example in which the observation target is a tsunami, but the observation target is not limited to a tsunami as long as it is larger than the resolution cell of the radar. The observation target can be a tornado, microburst, wind shear, or gust front, for example.

When the observation target is a tornado or wind shear, for example, the radio wave radiating unit 2 can radiate radio waves toward the air if the radar signal processing apparatus is installed on the ground, or radiate radio waves toward the Earth's surface if the radar signal processing apparatus is mounted in an airplane or satellite.

Alternatively, when the observation target is a microburst or gust front, radio waves can be radiated in a substantially horizontal direction if the radar signal processing apparatus is installed on the ground.

Although Embodiments 1-4 above illustrate that one of each of the radio wave radiating unit 2 and the radio wave receiving unit 5 is included and that the Doppler velocity calculating unit 11 of the signal processor 8 calculates the radial velocity of the current velocity as the Doppler velocity for each range cell, a plurality of each of the radio wave radiating unit 2 and the radio wave receiving unit 5 may be included and the signal processor 8 may calculate the current velocity as a vector quantity to be the Doppler velocity for each range cell.

Although Embodiments 1-4 above illustrate that the Doppler velocity calculating unit 11 of the signal processor 8 calculates the Doppler velocity for each range cell, each range cell need not coincide with the resolution cell determined by the band of radio waves radiated from the radio wave radiating unit 2 but may be a cell obtained by further dividing the resolution cell by super resolution processing or the like, for example. Alternatively, the cell may be larger than the resolution cell and smaller than the coarse resolution area.

Although Embodiments 1-4 above illustrate that a tsunami is detected using the range cell and the coarse resolution area, a tsunami may be detected using either the range cell or the coarse resolution area in a case where high detection accuracy is not required, for example.

Note that, within the scope of the invention, embodiments can be freely combined, modifications can be made to any component in the embodiments, or any component in the embodiments can be omitted.

INDUSTRIAL APPLICABILITY

The radar signal processing apparatus and the radar signal processing method according to the present disclosure are suitable for receiving radio waves reflected by an observation area and detecting an observation target from the radio waves.

REFERENCE SIGNS LIST

1: controller, 2: radio wave radiating unit, 3: transmitter, 4: transmitting antenna, 5: radio wave receiving unit, 6: receiving antenna, 7: receiver, 8: signal processor, 9: display, 11: Doppler velocity calculating unit, 12: coarse-resolution-area creating unit, 13: range cell detecting unit, 14: tsunami-candidate-cell extracting unit, 15: tsunami-candidate-area extracting unit, 16: tsunami cell determining unit, 21: Doppler velocity calculating circuit, 22: coarse-resolution-area creating circuit, 23: tsunami-candidate-cell extracting circuit, 24: tsunami-candidate-area extracting circuit, 25: tsunami cell determining circuit, 31: memory, 32: processor, 41: first range cell extracting unit, 42: second range cell extracting unit, 43, 44, 45: candidate cell extracting unit.

The invention claimed is:
1. A radar signal processing apparatus comprising:
a radio wave radiator for radiating radio waves toward a sea surface of an observation area;
a radio wave receiver for receiving the radio waves radiated and then reflected by the observation area; and processing circuitry
to calculate a Doppler velocity for each of range cells obtained by dividing the observation area along a range direction and an azimuth direction from the received radio waves;
to divide the observation area into coarse resolution areas each of which is an area larger than the range cell, and to calculate a Doppler velocity for each coarse resolution area from the Doppler velocities for the range cells that are included in each coarse resolution area out of the calculated Doppler velocities for the range cells; and
to detect a range cell in which a tsunami being an observation target is present from the calculated Doppler velocity for each of the coarse resolution areas and the calculated Doppler velocity for each of the range cells, wherein the circuitry is further configured
to extract, from among the range cells included in the observation area, a range cell in which a tsunami is likely to be present as a tsunami candidate cell on the basis of the calculated Doppler velocity for each of the range cells,
to extract, from among the coarse resolution areas included in the observation area, a coarse resolution area in which a tsunami is likely to be present as a tsunami candidate area on the basis of the calculated Doppler velocity for each of the coarse resolution areas, and
to determine that if the extracted tsunami candidate cell is included in an extracted coarse resolution area the tsunami candidate cell is the range cell in which a tsunami is present.

2. The radar signal processing apparatus according to claim 1, wherein the processing circuitry is further configured to extract, from among the range cells included in the observation area, a range cell in which a change in the calculated Doppler velocity is larger than or equal to a first threshold as a tsunami candidate cell.

3. The radar signal processing apparatus according to claim 1, wherein the processing circuitry is further configured:
to extract, from among the range cells included in the observation area, a range cell in which a change in the calculated Doppler velocity is larger than or equal to a first threshold;
to extract, from among the range cells included in the observation area, a range cell in which the Doppler velocity is higher than or equal to a second threshold; and
to extract a range cell extracted by using both the first threshold and the second threshold as a tsunami candidate cell.

4. The radar signal processing apparatus according to claim 1, wherein the processing circuitry is further configured:
to extract, from among the range cells included in the observation area, a range cell in which a change in the calculated Doppler velocity is larger than or equal to a first threshold;
to extract, from among the range cells included in the observation area, a range cell in which the calculated Doppler velocity is higher than or equal to a second threshold; and
to extract the range cell extracted by using the first threshold as a tsunami candidate cell and extracting the range cell extracted by using the second threshold as another tsunami candidate cell.

5. The radar signal processing apparatus according to claim 1, wherein the processing circuitry is further configured:
to extract, from among the range cells included in the observation area, a range cell in which a change in the calculated Doppler velocity is larger than or equal to a first threshold;
to extract, from among the range cells included in the observation area, a range cell in which the calculated Doppler velocity is higher than or equal to a second threshold; and
to calculate a magnitude of a range of the Doppler velocities for the observation area from the calculated Doppler velocities for the range cells and extract, as a tsunami candidate cell, a range cell extracted by using both the first threshold and the second threshold if the magnitude of the range is larger than or equal to a third threshold, or extracting the range cell extracted by using the first threshold as a tsunami candidate cell and the range cell extracted by using the second threshold as another tsunami candidate cell if the magnitude of the range is smaller than the third threshold.

6. A radar signal processing method comprising:
radiating radio waves toward a sea surface of an observation area,
receiving the radio waves radiated and then reflected by the observation area,
calculating a Doppler velocity for each of range cells obtained by dividing the observation area along a range direction and an azimuth direction from the received radio waves,
dividing the observation area into coarse resolution areas each of which is an area larger than the range cell, and calculating a Doppler velocity for each coarse resolution area from the Doppler velocities for the range cells that are included in each coarse resolution area out of the calculated Doppler velocities for the range cells,
extracting, from among the range cells included in the observation area, a range cell in which a tsunami is likely to be present as a tsunami candidate cell on the basis of the calculated Doppler velocity for each of the range cells,
extracting, from among the coarse resolution areas included in the observation area, a coarse resolution area in which a tsunami is likely to be present as a tsunami candidate area on the basis of the calculated Doppler velocity for each of the coarse resolution areas, and
determining that if the extracted tsunami candidate cell is included in an extracted coarse resolution area the tsunami candidate cell is the range cell in which a tsunami is present.

* * * * *